United States Patent
Miyazaki et al.

(10) Patent No.: US 9,395,908 B2
(45) Date of Patent: Jul. 19, 2016

(54) INFORMATION PROCESSING APPARATUS, INFORMATION PROCESSING METHOD, AND INFORMATION PROCESSING PROGRAM UTILIZING GESTURE BASED COPY AND CUT OPERATIONS

(75) Inventors: Reiko Miyazaki, Tokyo (JP); Akihiro Komori, Tokyo (JP); Ritsuko Kano, Tokyo (JP); Yoshihito Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 13/212,555

(22) Filed: Aug. 18, 2011

(65) Prior Publication Data

US 2011/0307843 A1 Dec. 15, 2011

(30) Foreign Application Priority Data

Sep. 6, 2010 (JP) ................................ P2010-199348

(51) Int. Cl.
| | | |
|---|---|---|
| G06F 3/048 | (2013.01) | |
| G06F 3/0488 | (2013.01) | |
| G06F 3/0486 | (2013.01) | |
| G06F 3/0484 | (2013.01) | |

(52) U.S. Cl.
CPC .......... *G06F 3/04883* (2013.01); *G06F 3/0486* (2013.01); *G06F 3/0488* (2013.01); *G06F 3/04845* (2013.01)

(58) Field of Classification Search
CPC .................................. G06F 3/048; G06F 3/00
USPC ......................................... 715/863, 255, 770
See application file for complete search history.

(56) References Cited

U.S. PATENT DOCUMENTS

| | | | | |
|---|---|---|---|---|
| 5,252,951 A | * | 10/1993 | Tannenbaum | G06F 3/023 345/156 |
| 5,809,267 A | * | 9/1998 | Moran | G06F 3/04883 715/863 |
| 6,057,845 A | * | 5/2000 | Dupouy | 715/863 |
| 6,545,669 B1 | * | 4/2003 | Kinawi | G06F 3/0486 345/1.1 |
| 7,532,196 B2 | * | 5/2009 | Hinckley | G06F 3/011 345/156 |
| 8,650,507 B2 | * | 2/2014 | Westerman | G06F 3/04883 715/863 |
| 8,924,892 B2 | * | 12/2014 | Roth | G06F 3/04883 715/702 |
| 2006/0085767 A1 | * | 4/2006 | Hinckley et al. | 715/863 |
| 2006/0125803 A1 | * | 6/2006 | Westerman et al. | 345/173 |
| 2006/0210958 A1 | * | 9/2006 | Rimas-Ribikauskas | G09B 7/00 434/362 |
| 2007/0115264 A1 | * | 5/2007 | Yu et al. | 345/173 |
| 2010/0031202 A1 | * | 2/2010 | Morris et al. | 715/863 |
| 2010/0031203 A1 | * | 2/2010 | Morris | G06F 3/04883 715/863 |

(Continued)

FOREIGN PATENT DOCUMENTS

JP 2009-205675 9/2009

*Primary Examiner* — Dino Kujundzic
(74) *Attorney, Agent, or Firm* — Paratus Law Group, PLLC

(57) ABSTRACT

An information processing apparatus includes an operation unit; and a control unit performing a process in response to an operation executed through the operation unit. Different gesture operations are able to be assigned to an operation corresponding to copy of information and an operation corresponding to cut of information, respectively. The control unit selects a portion designated by a user in information displayed on a display unit, and then copies the selected portion when the user executes the gesture operation corresponding to the copy through the operation unit, whereas the control unit cuts the selected portion when the user executes the gesture operation corresponding to the cut through the operation unit.

20 Claims, 11 Drawing Sheets

(56) References Cited

U.S. PATENT DOCUMENTS

| | | | |
|---|---|---|---|
| 2010/0235770 A1* | 9/2010 | Ording et al. | 715/863 |
| 2010/0333044 A1* | 12/2010 | Kethireddy | G06F 3/0481 715/863 |
| 2011/0145768 A1* | 6/2011 | Leffert | G06F 3/0482 715/863 |
| 2011/0154268 A1* | 6/2011 | Trent, Jr. | G06F 3/04883 715/863 |
| 2011/0163968 A1* | 7/2011 | Hogan | 345/173 |
| 2011/0185300 A1* | 7/2011 | Hinckley et al. | 715/863 |
| 2011/0258537 A1* | 10/2011 | Rives et al. | 715/255 |
| 2012/0044179 A1* | 2/2012 | Hudson | G06F 3/04883 345/173 |

* cited by examiner

INFORMATION PROCESSING APPARATUS, INFORMATION PROCESSING METHOD, AND INFORMATION PROCESSING PROGRAM UTILIZING GESTURE BASED COPY AND CUT OPERATIONS

BACKGROUND

The present disclosure relates to an information processing apparatus, an operation method, and an information processing program, and more particularly, to an information processing apparatus including a touch panel.

In recent years, information processing apparatuses including various types of operation devices have come into wide use. For example, in information processing apparatuses including a touch panel, an intuition operation can be executed by touch operations (touching, tapping, dragging, flicking, and the like) on a screen (for example, see Japanese Unexamined Patent Application Publication No. 2009-205675).

SUMMARY

In a lot of information processing apparatuses according to the related art, a part of information (for example, text) displayed on a screen can be copied and pasted to another place (so-called copy & paste) or a part of information can be cut and pasted to another place (so-called cut & paste).

When a user executes copy & paste or cut & paste with an information processing apparatus including a touch panel, the user first designates a desired part in a text by, for example, dragging.

Thereafter, the user executes a predetermined touch operation to display a menu and selects copy or cut from the menu. Here, when the user selects the copy, the desired part is copied to a clipboard. On the other hand, when the user selects the cut, the desired part is moved to the clipboard.

Finally, the user designates a place to which the desired part (that is, the part stored in the clipboard) is to be pasted by, for example, tapping. As a consequence, the desired part can be pasted to the designated place.

The operation of the copy & paste or the cut & paste is executed by such an operation.

Here, when the operation of the copy & paste or the cut & paste can be executed more easily, it is expected that operability of an information processing apparatus can be further improved.

It is desirable to provide an information processing apparatus, an operation method, and an information processing program that improve operability more than that of the related art.

According to an embodiment of the disclosure, there is provided an information processing apparatus including: an operation unit performing an input operation in response to a gesture operation; and a control unit performing a process in response to an input operation executed through the operation unit. Different gesture operations are able to be assigned to copy of information and cut of information, respectively. When a portion to be copied or cut from any information is designated through the operation unit and then a gesture operation corresponding to the copy is executed through the operation unit, the control unit copies the designated portion, whereas the control unit cuts the designated portion when a gesture operation corresponding to the cut is executed.

Thus, by assigning the different gesture operations to the copy and the cut, respectively, it is possible to selectively perform the copy or the cut by the gesture operation without a trouble of specially displaying a menu and selecting the copy or the cut from the menu.

According to the embodiment of the disclosure, it is possible to selectively perform the copy or the cut by the gesture operation without a trouble of specially displaying a menu and selecting the copy or the cut from the menu. Further, since operations of copy & paste and cut & paste can be executed more easily, it is possible to realize an information processing apparatus, an operation method, and an information processing program capable of further improving operability compared to the related art.

DETAILED DESCRIPTION OF EMBODIMENTS

Hereinafter, best modes (hereinafter, referred to as embodiments) of the disclosure will be described. The description thereof will be made in the following order.

1. Embodiment
2. Other Embodiments

1. Embodiment

1-1. Overview of Embodiment

First, the overview of an embodiment will be described. A specific example of the embodiment will be described after the description of the overview of the embodiment.

Figure 1:
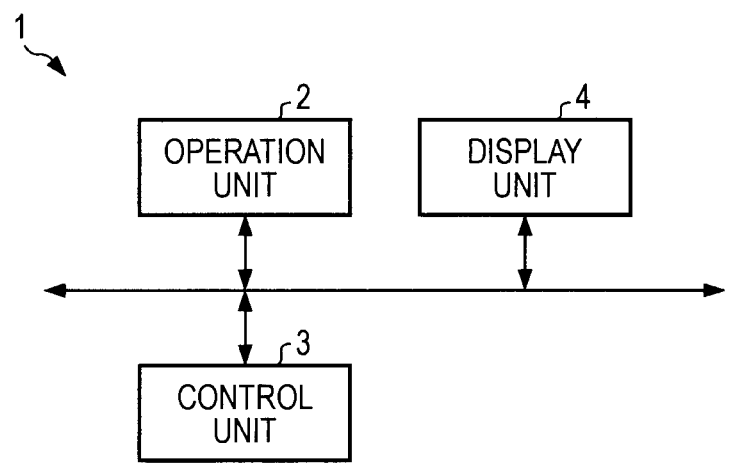
FIG. 1 is a block diagram illustrating the overall functional configuration of an information processing apparatus according to an embodiment.

In FIG. 1, reference numeral 1 denotes an information processing apparatus. The information processing apparatus 1 includes an operation unit 2. The information processing apparatus 1 further includes a control unit 3 that performs a process in response to an operation of the operation unit 2.

In the information processing apparatus 1, different gesture operations can be assigned to an operation corresponding to copy of information and an operation corresponding to cut of information.

In the information processing apparatus 1, when the control unit 3 selects a portion designated by the user in information displayed on a display unit 4 and then a gesture operation corresponding to copy is executed on the operation unit 2, the control unit 3 copies the selected portion. On the other hand, when the user executes a gesture operation corresponding to cut, the control unit 3 cuts the selected portion.

By assigning the different gesture operations to the copy and cut, it is possible to selectively execute copy or cut by the gesture operation without any trouble of specially displaying the menu and selecting copy or cut from the menu.

Here, it is assumed that the operation unit 2 can perform a touch operation and sets the gesture operation corresponding to the copy and the gesture operation corresponding to the cut as different predetermined touch operations.

The control unit 3 displays a selection frame used for the user to designate a selection range, which is a selected portion, together with information on the display unit 4 in response to an operation on the operation unit 2 and decides that a portion enclosed by the selection frame in the information is selected.

In this case, for example, when the user touches the inside of the selection frame displayed on the display unit 4 and executes the gesture operation corresponding to the copy, the control unit 3 copies the selected portion. On the other hand, when the user touches the inside of the selection frame and executes the gesture operation corresponding to the cut, the control unit 3 cuts the selected portion.

Here, when the user executes the gesture operation corresponding to the copy or the cut, the control unit 3 may copy or cut out the selected portion and may display a sub-screen indicating that the selected portion is copied or cut out on the display unit 4 for a predetermined time.

When the user touches the inside of the sub-screen and executes the gesture operation corresponding to the cut during the display of the sub-screen after the copy of the selected portion, the control unit 3 may change the selected portion from the copy to the cut. Alternatively, when the user touches the inside of the sub-screen and executes the gesture operation corresponding to the copy during the display of the sub-screen after the cut of the selected portion, the control unit 3 may change the selected portion from the cut to the copy.

When the user changes the selection range to change the size of the selection frame by dragging on the operation unit 2 and continuously executes the gesture operation corresponding to the copy or cut without detaching his or her finger executing the dragging, the control unit 3 may select the portion enclosed by the selection frame at this time and may copy or cut out the selected portion.

For example, when the user touches an image included in the information and executes the gesture operation corresponding to the copy or the cut, the control unit 3 performs the processes from the selection of the image to the copy or cut of the image in one step.

For example, the gesture operation corresponding to the above-described copy is assumed to be a touch operation of half-rotating a touching finger right or left by touching the inside of the selection frame and then pressing the fingertip.

Further, for example, the gesture operation corresponding to the above-described cut is assumed to be a touch operation of touching the inside of the selection frame with a finger, skimming the portion enclosed by the selection frame, and smoothly moving the finger in any direction.

A specific example of the information processing apparatus 1 with such a configuration will be described in detail below.

Figure 2:
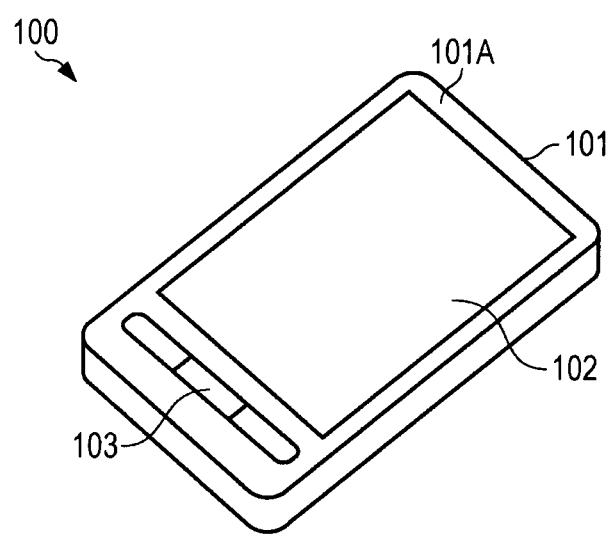
FIG. 2 is a schematic diagram illustrating the outer appearance configuration of a portable terminal.

1-2. Specific Example of Embodiment 1-2-1. Outer Appearance of Portable Terminal Next, a specific example of the embodiment will be described. The outer appearance configuration of a portable terminal 100, which is a specific example of the above-described information processing apparatus 1, will be first described with reference to FIG. 2.

The portable terminal 100 has a substantially flat rectangular casing 101 with a size that a user can grasp with one hand.

A rectangular touch screen 102 is disposed on the middle portion of a front surface 101A of the casing 101. The touch screen 102 includes a liquid crystal panel and a thin transparent touch panel covering the display surface of the liquid crystal panel. For example, the touch panel is an electrostatic capacity touch panel.

The portable terminal 100 receives a touch operation executed with a finger (or a touch pen or the like corresponding to the electrostatic capacity type) on the touch screen 102 as an input operation of the user.

On the front surface 101A of the casing 101 of the portable terminal 100, an operation button 103 is disposed in the vicinity of the touch screen 102.

The portable terminal 100 is configured so as to be used in a direction (which is also referred to as a vertical direction) in which the rectangular touch screen 102 is vertically long or in a direction (which is also referred to as a horizontal direction) in which the rectangular touch screen 102 is horizontally long.

1-2-2. Hardware Configuration of Portable Terminal

Figure 3:
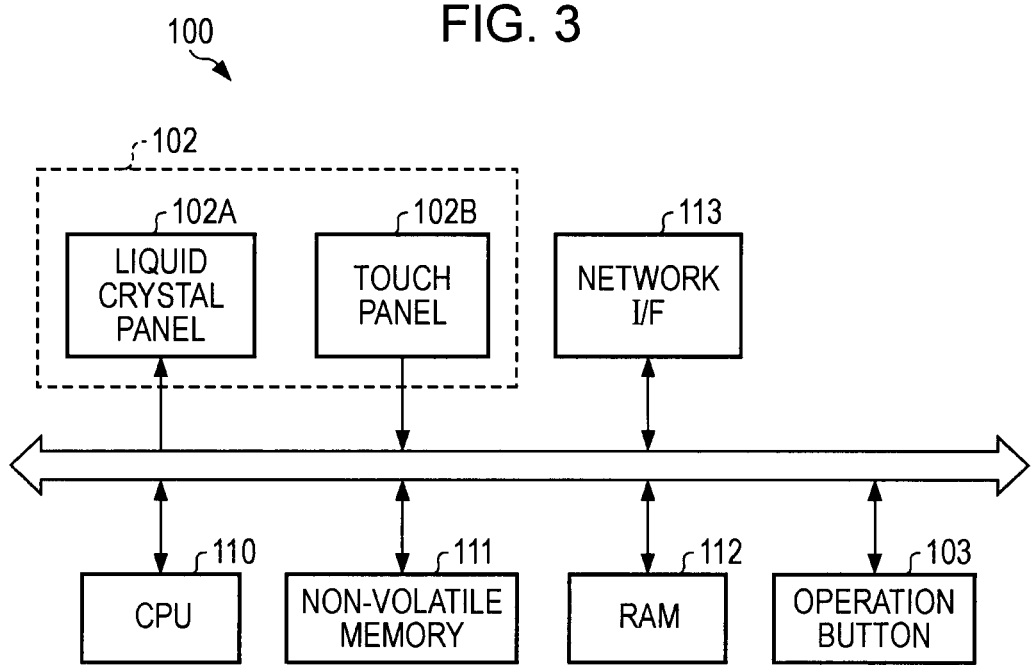
FIG. 3 is a block diagram illustrating the hardware configuration of the portable terminal.

Next, the hardware configuration of the portable terminal 100 will be described with reference to FIG. 3. In the portable terminal 100, a CPU 110 reads a program stored in a non-volatile memory 111 and deploys and reads the program on the RAM 112 in order to execute various kinds of processes and control each unit in accordance with the program. A central processing unit is abbreviated to CPU and a random access memory is abbreviated to RAM.

The touch screen 102 includes a liquid crystal panel 102A that is a display device displaying various kinds of information and a touch panel 102B that is an input operation device receiving an input operation.

The touch panel 102B is of an electrostatic capacity type and includes a plurality of electrostatic sensors (not shown in the drawing) arranged in a lattice shape on the operation surface. Each of the plurality of electrostatic sensors changes an output value in response to an electrostatic capacity changing as a conductor such as a finger approaches the operation surface.

The touch panel 102B transmits the changed output value of each electrostatic sensor and the position of each electrostatic sensor to the CPU 110.

Figure 4:
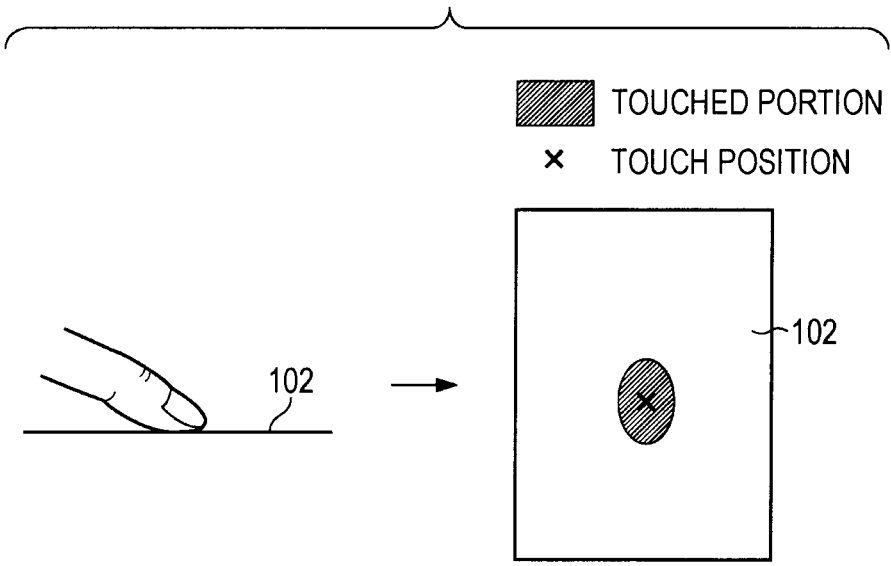
FIG. 4 is a schematic diagram illustrating detection of a touch position.

As shown in FIG. 4, the CPU 110 specifies a portion touched with a finger on the operation surface (that is, the screen of the liquid crystal panel 102A) of the touch panel 102B based on the output value and the position of each electrostatic sensor. Further, for example, the CPU 110 specifies a portion for which an output value is equal to or greater than a predetermined value as the portion touched with a finger.

The CPU 110 recognizes the gravitational center or the center (that is, the gravitational center or the center of the ball of a finger touched on the operation surface) of the touched portion as a touch position on the screen.

The CPU 110 detects the displacement of the touch position by acquiring the output value and the position of each electrostatic sensor from the touch panel 102B at a predetermined time interval and sensing the touch position from the touched portion.

The CPU 110 then recognizes the movement (that is, the trajectory of the touch position) of the touch position on the screen based on the displacement of the touch position.

The CPU 110 identifies a touch operation executed on the screen based on the touch position and the trajectory recognized in this way, receives the touch operation as an input operation, and performs a process in response to the input operation.

The CPU 110 is configured to receive a touch operation, such as touching, tapping, dragging, or flicking, as an input operation.

Further, the CPU 110 is configured to receive a touch operation (so-called gesture operation) of tracing a specific trajectory as an input operation separately from the general touch operations.

When the CPU 110 recognizes a pressing operation of pressing the operation button 103, the CPU 110 is configured to receive the pressing operation as an input operation executed by the user and perform a process in response to the input operation.

The CPU 110 is configured to perform communication by transmitting and receiving various kinds of data to and from an external apparatus via a network interface 113.

For example, when a list of icons corresponding to document files stored in the non-volatile memory 111 is displayed on the touch screen 102, it is assumed that the user taps a desired icon.

The CPU 110 receives this touch operation as an input operation of displaying a document and reads the document file corresponding to the tapped icon from the non-volatile memory 111.

The CPU 110 extracts document data from the document file and displays the document which is based on the document data on the liquid crystal panel 102A of the touch screen 102.

The document file may include image data as well as the document data in some cases. In this case, the CPU 110 displays a document which is based on the document data and displays an image which is based on the image data at a position designated in the document.

In this way, the portable terminal 100 is configured to display a document (or a document plus an image) designated by the user.

Further, the portable terminal 100 is configured to copy a desired part of a document displayed on the touch screen 102 and paste the desired part to another place (copy & paste) or to cut a desired part of a document displayed thereon and paste to another place (cut & paste).

An operation method of the copy & paste and the cut & paste will be described in detail below.

A specific hardware example of the operation unit 2 of the information processing apparatus 1 described in the overview of the embodiment is the touch panel 102B of the above-described portable terminal 100. A specific hardware example of the control unit 3 of the information processing apparatus 1 is the CPU 110 of the portable terminal 100. A specific hardware example of the display unit 4 of the information processing apparatus 1 is the liquid crystal panel 102A of the portable terminal 100.

1-2-3. Operation Method of Copy & Paste and Cut & Paste

When the icon is tapped, as described above, the CPU 110 of the portable terminal 100 reads the document file corresponding to this icon.

The CPU 110 operates a document display application by reading an application (also referred to as an app) that displays a document from the non-volatile memory 111 and executing the application.

Figure 5:
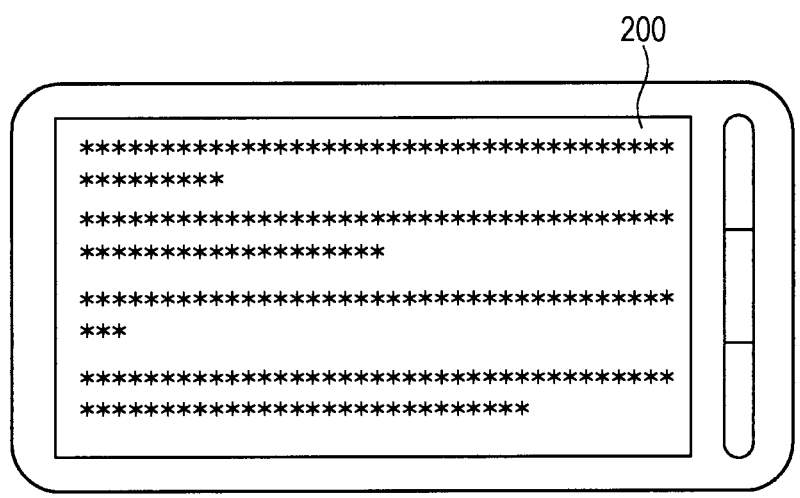
FIG. 5 is a schematic diagram illustrating the configuration of a document display screen.

When the CPU 110 operates the document display app, the CPU 110 displays a document display screen 200 on the touch screen 102, as shown in FIG. 5.

In FIG. 5, the horizontally long document display screen 200 is displayed on the horizontal touch screen 102.

The CPU 110 displays the document which is based on the document data acquired from the read document file on the document display screen 200. At this time, the CPU 110 first displays a document corresponding to one screen from its beginning in the entire document.

In FIG. 5, for example, a few of lines of a horizontally written document corresponding to one screen is displayed from its beginning on the document display screen 200.

Here, it is configured that the document is scrolled in any direction on the document display screen 200.

Specifically, the CPU 110 scrolls the document in the upward direction in response to dragging executed in the upward direction of the screen and scrolls the document in the downward direction in response to dragging executed in the downward direction of the screen.

In this way, since the displayed document can be scrolled on the document display screen 200, the user can view the entire document.

Further, it is configured that any portion in the document being displayed on the screen is selected on the document display screen 200.

Figure 6A:
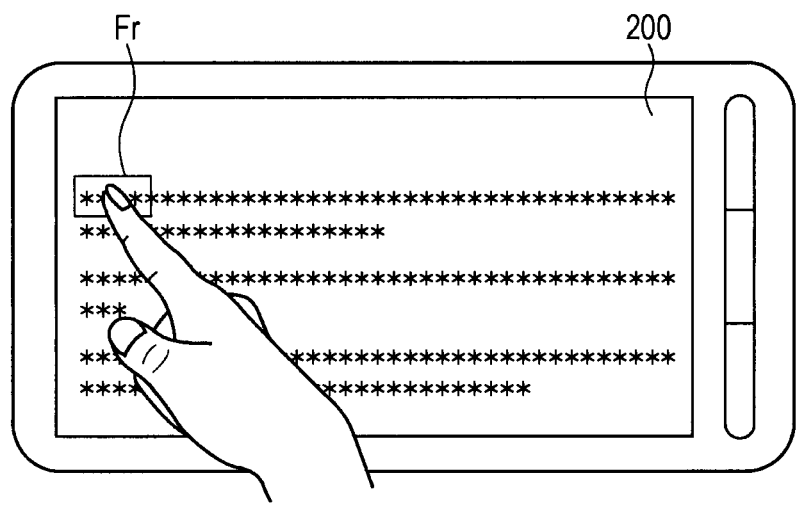
FIGS. 6A and 6B are schematic diagrams illustrating selection of a desired part.
Figure 6A:

Specifically, when the user touches any place of the document display screen 200 for a time equal to or greater than a predetermined time (that is, when the user executes long pressing), as shown in FIG. 6A, the CPU 110 displays a frame Fr with a predetermined size at any place. The frame Fr indicates a selection range. Hereinafter, the frame Fr is also referred to as a selection frame.

Figure 6B:
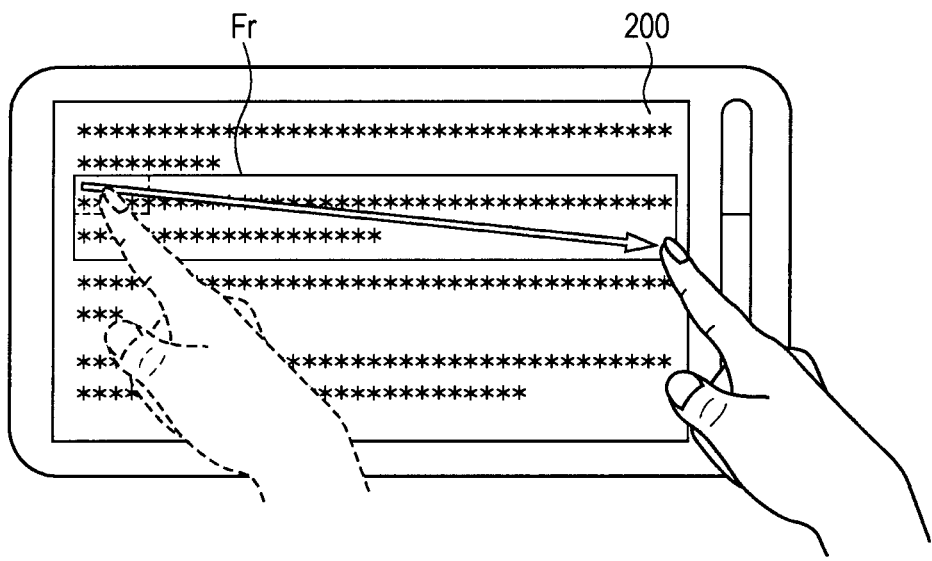

When the user executes dragging without detaching his or her finger touching any portion, as shown in FIG. 6B, the CPU 110 makes the selection frame Fr large or narrow in any direction to change the selection range Fr in response to the dragging.

Thereafter, when the user detaches his or her finger, the CPU 110 decides the selection range by fixing the size of the selection frame Fr. At this time, a portion enclosed by the selection frame Fr (that is, inside the selection range) becomes a selection portion.

In this way, the position or the size of the selection frame Fr indicating a selection range can be freely changed on the document display screen 200. Therefore, a desired part can be selected by changing the position or the size of the selection frame Fr so that the desired part in a document enters the selection frame Fr.

For example, when the user taps the selection frame Fr, the CPU 110 deletes the selection frame Fr from the screen and cancels the selection range.

On the document display screen 200, a selected portion in the document can be copied or cut by a gesture operation.

Figure 7A:
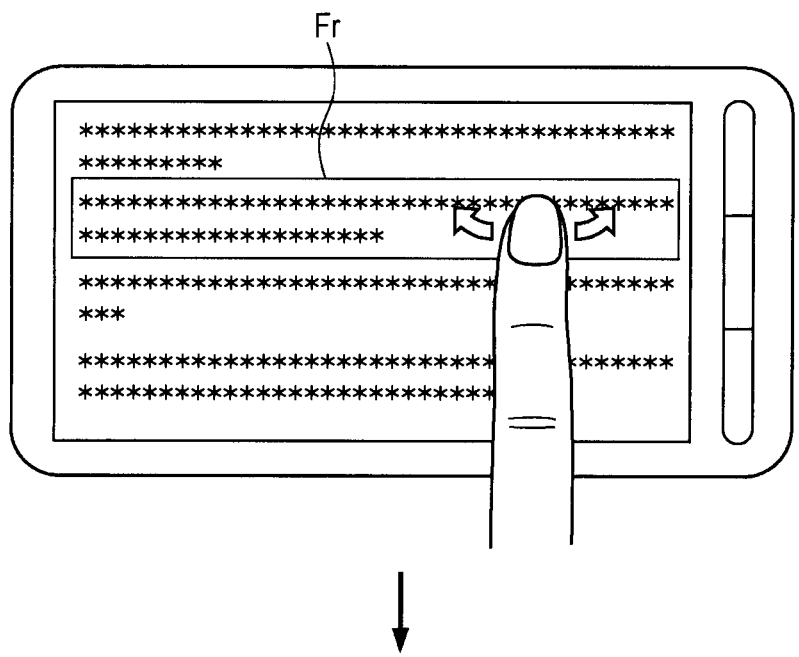
FIGS. 7A and 7B are schematic diagrams illustrating copy by a copy gesture.

In order to actually copy the selected portion, as shown in FIG. 7A, the user executes a gesture operation of touching the inside of the selection frame Fr with his or her finger in a state where the selection frame Fr is displayed, pressing the fingertip, and half-rotating his or her finger right and left. Hereinafter, this gesture operation is also referred to as a copy gesture.

When the CPU 110 recognizes that the user executes the copy gesture, the CPU 110 copies the selected portion in a clipboard which is a part of the RAM 112.

In effect, the trajectory of the touch position formed when the user executes the copy gesture is the same as the trajectory formed by dragging of reciprocating the finger right and left within the range of the finger width.

Therefore, when the user reverses the direction of the dragging from the left to the right or from the right to the left during the dragging, the CPU 110 determines that this operation is the copy gesture.

Specifically, the CPU 110 detects the touch position at a predetermined time interval and calculates a movement vector from the previous touch position to the current touch position.

The CPU 110 acquires the angle formed between the movement vector and an X axis parallel to the screen as a drag angle. Here, it is assumed that the direction of the X axis is set from the left side of the screen to the right side of the screen and the direction of a Y axis perpendicular to the screen is set from the lower side of the screen to the upper side of the screen.

For example, when the direction of the movement vector is set from the left side of the screen to the right side of the screen so as to be parallel to the X axis, the drag angle at this time is 0 degrees. When the direction of the movement vector is set from the lower side of the screen to the upper side of the screen so as to be perpendicular to the X axis, the drag angle at this time is 90 degrees.

When the direction of the movement vector is set from the upper side of the screen to the lower side of the screen so as to be perpendicular to the X axis, the drag angle at this time is −90 degrees. When the direction of the movement vector is set from the right side of the screen to the left side of the screen so as to be parallel to the X axis, the drag angle at this time is 180 degrees (or may be −180 degrees).

Thus, the drag angle is set to have a value within a range from +180 degrees to −180 degrees.

Further, the CPU 110 calculates the absolute value of a difference between the previously calculated drag angle and the currently calculated drag angle.

The difference becomes 0 degrees during the dragging in a given direction. For example, when the user reciprocates the dragging right and left and reverses the direction of the dragging, the absolute value of the difference becomes 180 degrees.

When the direction of the dragging is the horizontal direction of the screen and the absolute value of the difference of the drag angle is equal to or greater than a predetermined value (for example, 90 degrees), the CPU 110 determines that the direction of the dragging is reversed from the left side to the right side or from the right side to the left side during the dragging. In addition, the CPU 110 determines that this operation is the copy gesture.

Precisely speaking, when the absolute value of the difference of the drag angle becomes 180 degrees, the direction of the dragging is reversed. In this case, however, the user has to execute the precise copy gesture, and thus operability may deteriorate.

When the angle of the dragging becomes 90 degrees, it is considered that the direction of the dragging is reversed in terms of the portable terminal 100. In this way, since the user can easily execute the copy gesture, the operability is improved.

Precisely speaking, when the angle of the dragging becomes 0 degrees or 180 degrees, the direction of the dragging is the horizontal direction of the screen. However, when the angle of the dragging is set to be within the range of, for example, ±30 degrees from 0 degrees or 180 degrees in consideration of the operability, it is considered that the user executes the dragging in the horizontal direction of the screen.

In this way, the CPU 110 determines the copy gesture and recognizes that the user executes the copy gesture.

Figure 7B:
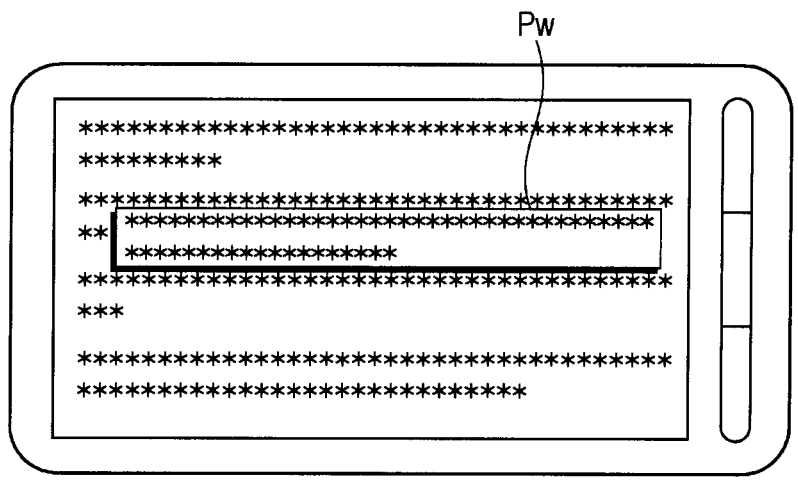

When the CPU 110 recognizes that the user executes the copy gesture, the CPU 110 copies the selected portion as data (which is also referred to as clip data) to the clipboard. As shown in FIG. 7B, the CPU 110 displays a pop-up Pw indicating the copied selected portion so as to cover a part of the selected portion displayed on the document display screen 200.

For example, the copied selected portion is displayed without any change or is displayed in a reduced manner in the pop-up Pw.

Thus, the portable terminal 100 can visually show the user the fact that the CPU 110 recognizes the copy gesture and copies the selected portion. The pop-up Pw is cleared from the screen after a predetermined time (for example, a few seconds) elapses.

In this way, it is configured that the selected portion in the document is copied on the document display screen 200.

Figure 8A:
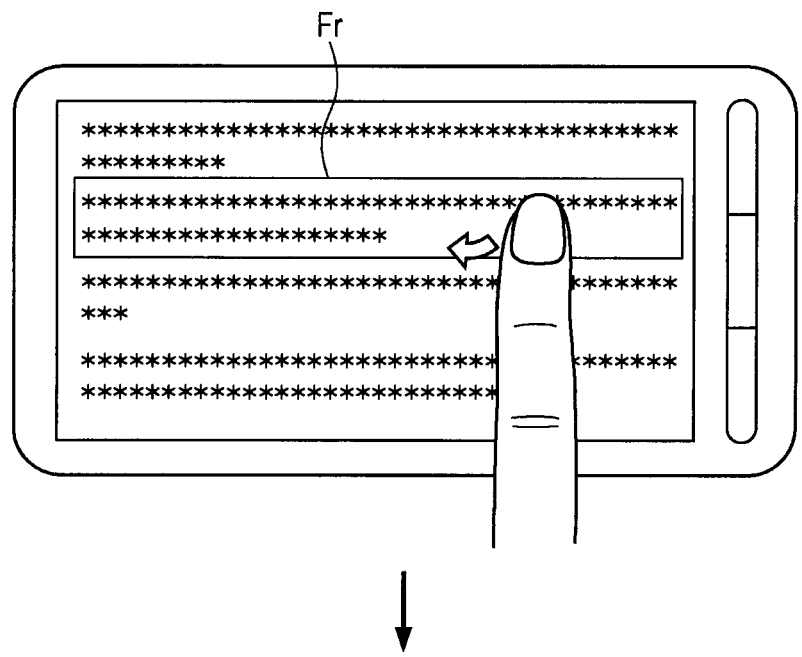
FIGS. 8A and 8B are schematic diagrams illustrating cut by a cut gesture.

Meanwhile, in order to cut the selected portion, as shown in FIG. 8A, the user executes a gesture operation of touching the inside of the selection frame Fr with his or her finger in a state where the selection frame Fr is displayed, skimming the selected portion enclosed by the selection frame Fr, smoothly moving his or her finger in any direction in a short time, and detaching his or her finger. Hereinafter, this gesture operation is also referred to as a cut gesture.

When the CPU 110 recognizes that the user executes the cut gesture, the CPU 110 moves the selected portion to a cut clipboard.

In effect, the trajectory of the touch position formed when the user executes the copy gesture is the same as the trajectory formed when the user executes dragging at a short distance.

Thus, when the length of the dragging executed from the inside of the selection frame Fr is equal to or less than a predetermined value, the CPU 110 determines that this operation is the cut gesture and recognizes that the user executes the cut gesture.

Figure 8B:
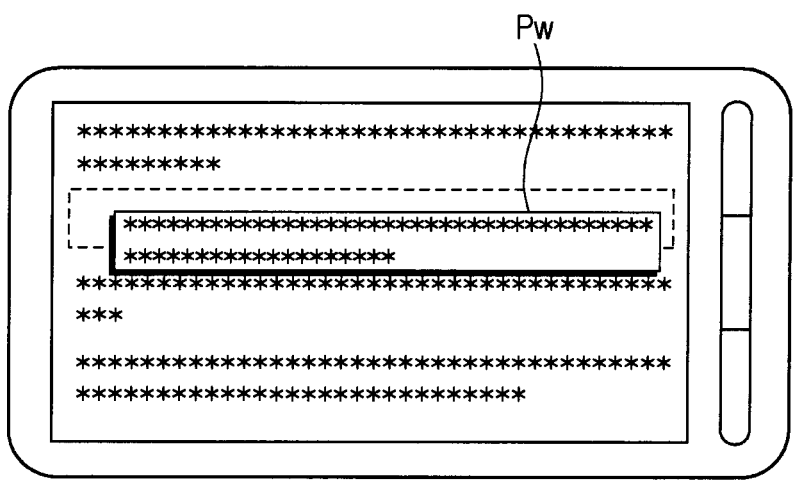

When the CPU 110 recognizes that the user executes the cut gesture, the CPU 110 cuts the selected portion from the document and moves the selected portion as clip data to the clipboard. As a consequence, as shown in FIG. 8B, the place where the selected portion is displayed becomes blank on the document display screen 200.

Further, the CPU 110 displays the pop-up Pw indicating the cut selected portion so as to cover a part of the place (that is, the blank portion) where the selection portion is displayed.

Thus, the portable terminal 100 can visually show the user the fact that the CPU 110 recognizes the cut gesture and copies the selected portion. The pop-up Pw is cleared from the screen after a predetermined time (for example, a few seconds) elapses.

In this way, it is configured that the selected portion in the document is cut on the document display screen 200.

In some cases, on the document display screen 200, the copied or cut selected portion (that is, the clip data stored in the clipboard) is pasted to any place in the document.

Specifically, when the user long presses any place in the document displayed on the document display screen 200 in the state where the clip data is stored, the CPU 110 displays a dialog box, which is used to select whether the clip data is pasted, in the vicinity of any place.

When the user selects the intention to paste the clip data through the dialog box, the CPU 110 acquires the clip data from the clipboard and pastes the clip data to the place where the user has long pressed.

In this way, the clip data can be pasted to any place in the document on the document display screen 200.

As described above, the user can select any portion in the document and can copy, cut, and paste the selected portion by executing a simple touch operation on the document display screen 200.

In particular, the selected portion can be selectively copied or cut by the once executed gesture operation (the copy gesture or the cut gesture).

Thus, the portable terminal 100 can execute the copy and the cut more easily, compared to the case where a selected portion is designated, a menu is displayed by a predetermined touch operation, and the copy or the cut is selected from the menu.

However, it is considered that the operability is further improved, when the selected portion is cut (or copied) and the selected portion can be easily changed from the cut to the copy (or the copy from the cut) before the selected portion is pasted.

Accordingly, the selected portion can be changed from the cut to the copy by executing the copy gesture on the pop-up Pw while the pop-up Pw is displayed on the document display screen 200 after the cut of the selected portion.

Specifically, when the user executes the cut gesture on the selection frame Fr indicating the selected portion, the CPU 110 moves the selected portion from the document to the cut clipboard. As a consequence, the place where the selected portion is displayed becomes blank on the document display screen 200.

At this time, the CPU 110 displays the pop-up Pw, where the cut selected portion is described, so as to cover a part of the place (that is, the blank portion) where the selected portion is displayed.

Figure 9A:
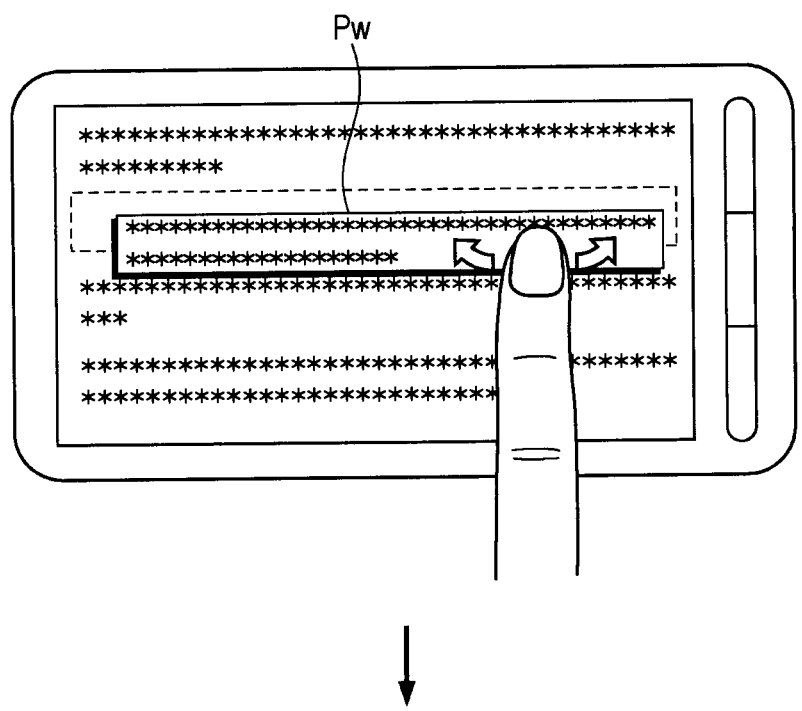
FIGS. 9A and 9B are schematic diagrams for explaining change from the cut to the copy.
Figure 9A:

As shown in FIG. 9A, it is assumed that the user touches the inside of the pop-up Pw during the display of the pop-up Pw and executes the copy gesture from the touched portion.

Then, the CPU 110 changes the selected portion from the cut to the copy in response to the copy gesture.

Figure 9B:
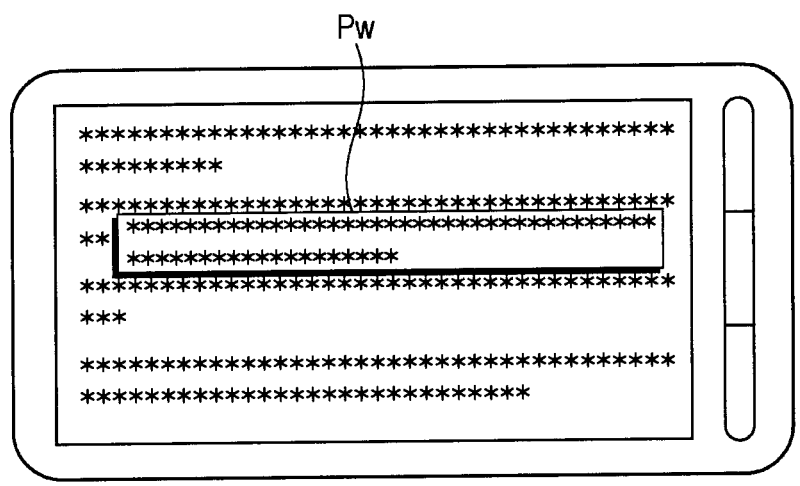

As a consequence, as shown in FIG. 9B, the selected portion is displayed again on the document display screen 200 at the place which is blank after the selected portion is cut.

On the document display screen 200, the selected portion can be changed from the cut to the copy before the selected portion is pasted after the selected portion is cut in this way.

Further, on the document display screen 200, the selected portion can be changed from the copy to the cut before the selected portion is pasted after the copy of the selected portion.

In this case, when the user touches the inside of the pop-up Pw and executes the cut gesture from the touched portion during the display of the pop-up Pw after the copy of the selected portion, the CPU 110 changes the selected portion form the copy to the cut. As a consequence, the selected portion is cut and becomes blank on the document display screen 200.

Thus, the portable terminal 100 can easily change the selected portion from the cut to the copy or from the copy to the cut before the selected portion is pasted, even when the selected portion is cut or copied.

As described above, the document file may contain image data as well as the document data. In this case, both the document based on the document data and an image based on the image data are displayed at positions designated in the document on the document display screen 200.

Here, it is configured that any image can be copied or cut on the document display screen 200.

Figure 10A:
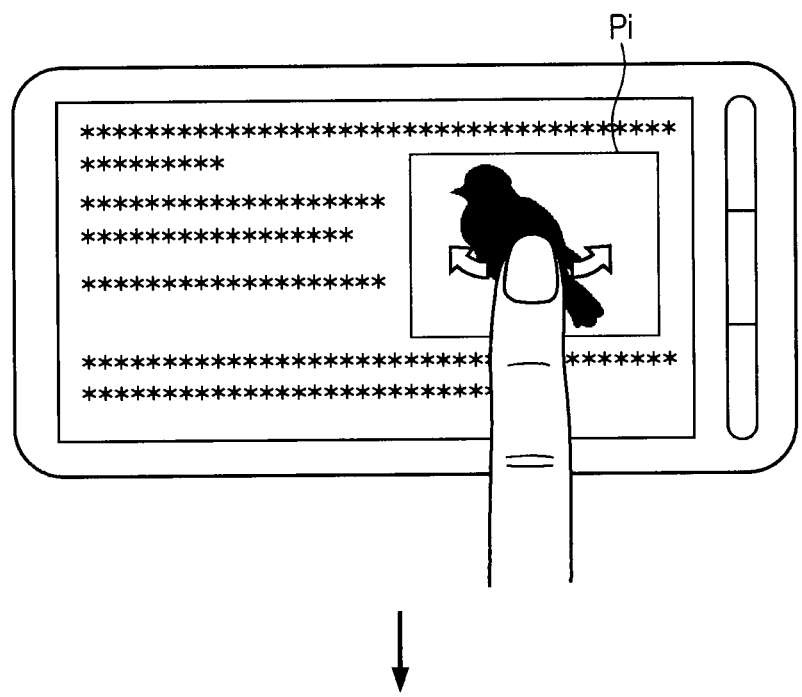
FIGS. 10A and 10B are schematic diagrams illustrating copy of an image.

In effect, in order to copy an image, as shown in FIG. 10A, the user touches an image Pi in a state where the image Pi is displayed on the document display screen 200, and then executes the copy gesture from the touched portion. That is, the user executes the copy gesture from the inside of the image Pi.

Figure 10B:
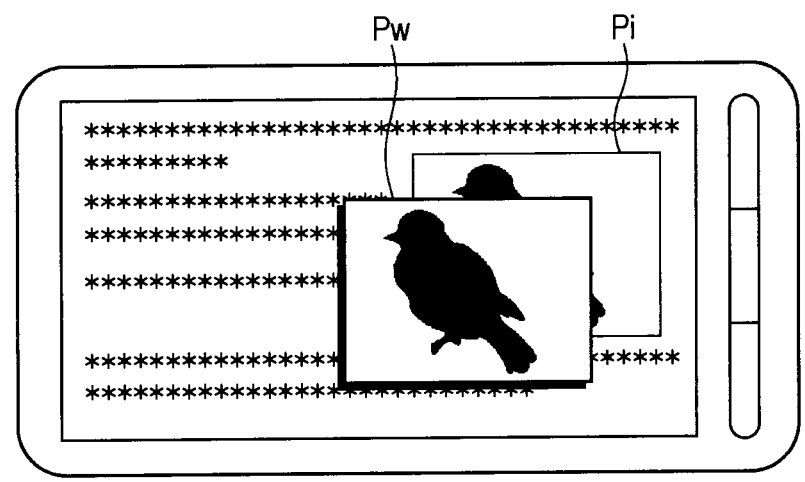

When the CPU 110 recognizes that the user executes the copy gesture from the inside of the image Pi, the CPU 110 copies the image Pi as clip data to the clipboard. As shown in FIG. 10B, the CPU 110 displays the pop-up Pw indicating the copied image so as to cover a part of the image Pi displayed on the document display screen 200.

In this way, the image in the document can be copied on the document display screen 200.

Figure 11A:
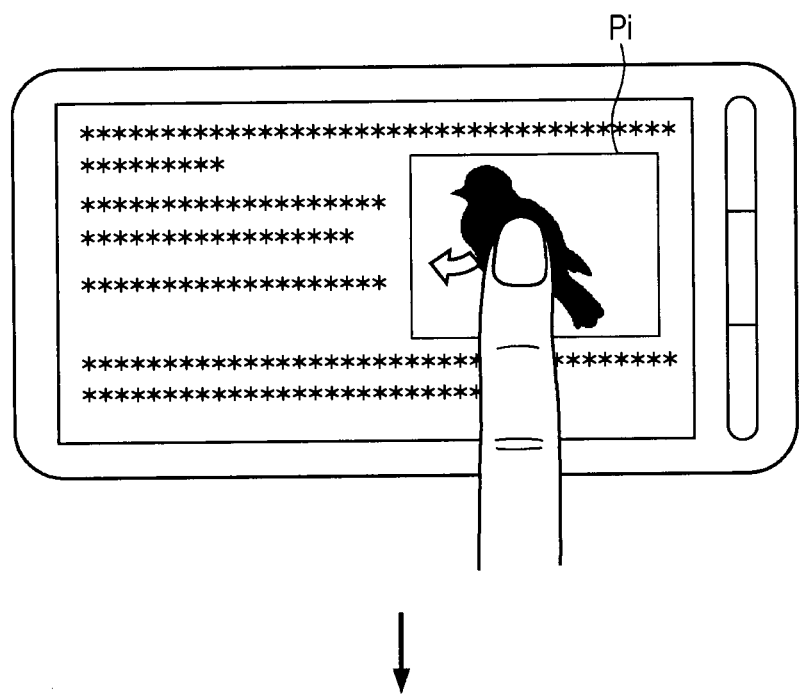
FIGS. 11A and 11B are schematic diagrams illustrating cut of an image.

Meanwhile, in order to cut an image, as shown in FIG. 11A, the user touches the image Pi in a state where the arbitrary image Pi is displayed on the document display screen 200, and then executes a cut gesture from the touched portion. That is, the user executes the cut gesture from the inside of the image Pi.

Figure 11B:
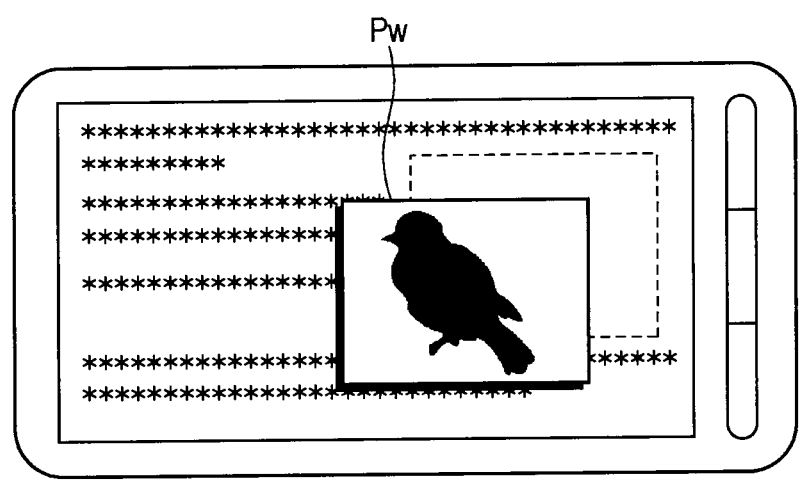

When the CPU 110 recognizes that the user executes the cut gesture from the inside of the image Pi, the CPU 110 cuts the image Pi from the document and moves the cut image Pi as clip data to the clip data. As a consequence, as shown in FIG. 11B, the place where the image Pi is displayed becomes blank on the document display screen 200.

Further, the CPU 110 displays the pop-up Pw indicating the cut image Pi so as to cover a part of the place (that is, the blank place) where the image Pi is displayed.

In this way, it is configured that the image in the document is cut on the document display screen 200.

On the document display screen 200, an image can be selected and then copied or cut by the once executed gesture operation (the copy gesture or the cut gesture).

Thus, the image copied or cut in this way can be pasted to any place in the document in accordance with the same operation method as that of the document.

Further, both a document and an image can be copied or cut on the document display screen 200 by including both the document and the image in the inside of the selection frame Fr.

1-2-4. Processing Sequence in Copy or Cut

Next, a specific processing sequence in which the portable terminal 100 copies or cuts the selected portion in the document will be described with reference to the flowchart shown in FIG. 12.

Figure 12:
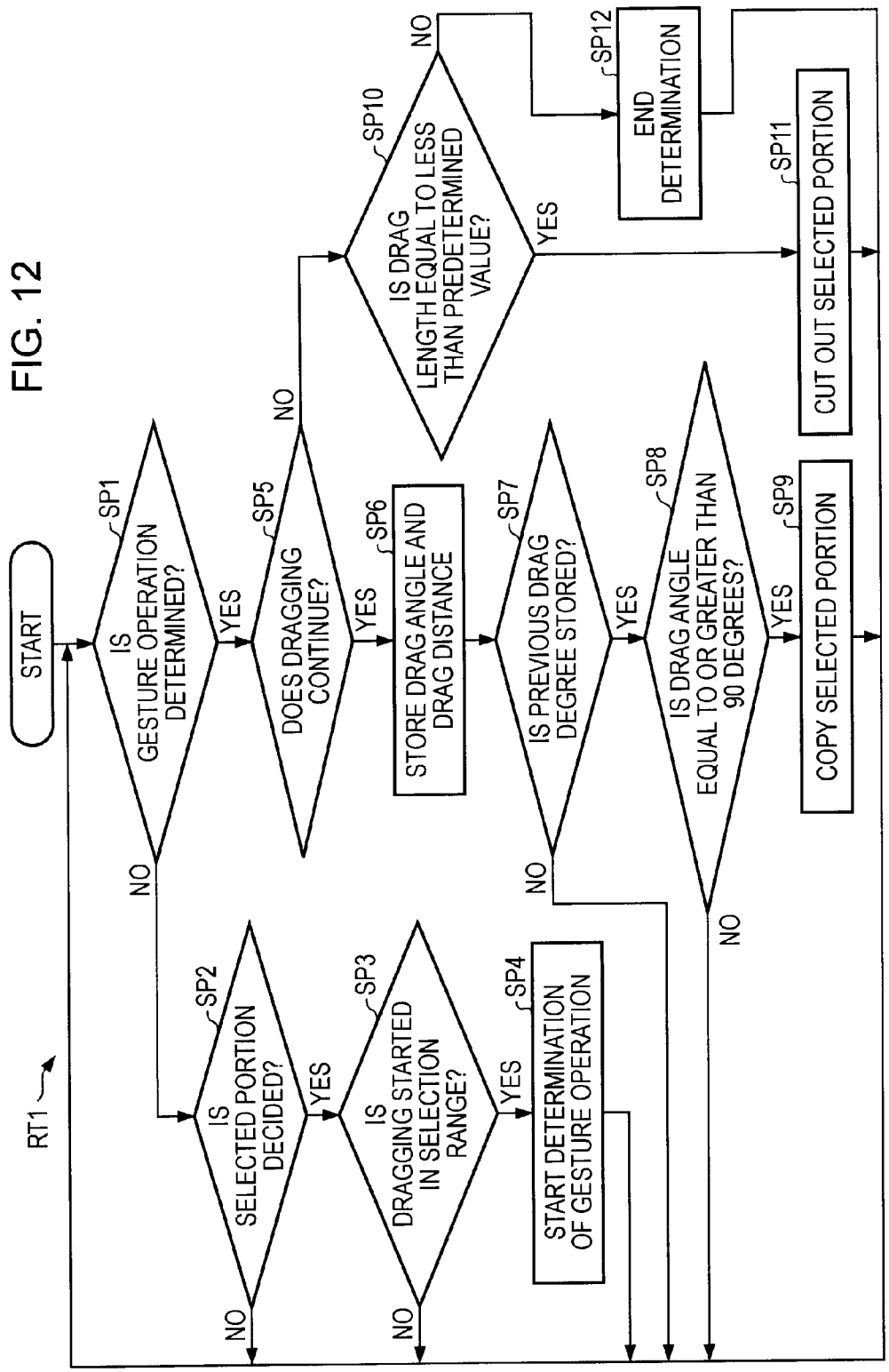
FIG. 12 is a flowchart illustrating a processing sequence.

A processing sequence RT1 shown in FIG. 12 is a processing sequence which the CPU 110 of the portable terminal 100 executes in accordance with a program stored in the nonvolatile memory 111.

When the CPU 110 displays the document display screen 200 and recognizes that the user executes the touch operation in this state, the CPU 110 starts the processing sequence RT1 and the process proceeds to step SP1.

In step SP1, the CPU 110 determines whether the touch operation is determined as the gesture operation (the copy gesture operation or the cut gesture). When the gesture operation is not determined and thus the negative result is obtained in step SP1, the CPU 110 allows the process to proceed to SP2.

In step SP2, the CPU 110 determines whether the selection range indicating the selected portion in the document is decided. When the selection range is not decided and thus the negative result is obtained in step SP2, the CPU 110 returns the process to step SP1.

On the other hand, when the selection range is decided and thus the positive result is obtained in step SP2, the CPU 110 allows the process to proceed to step SP3.

In step SP3, the CPU 110 determines whether the touch operation is dragging executed from the inside of the selection frame Fr.

When the negative result is obtained in step SP3, the negative result means that this touch operation is not dragging executed from the inside of the selection frame Fr and there is no possibility that this touch operation is the copy gesture or the cut gesture. Then, the CPU 110 returns the process to step SP1.

On the other hand, when the positive result is obtained in step SP3, the positive result means that this touch operation is the dragging executed from the inside of the selection frame Fr and there is a possibility that this touch operation is the copy gesture or the cut gesture. Then, the CPU 110 allows the process to proceed to step SP4.

In step SP4, the CPU 110 starts to determine whether the touch operation is the copy gesture or the cut gesture, and then returns the process to step SP1.

When the CPU 110 starts the determination in step SP4, the CPU 110 obtains the positive result in step SP1 and then allows the process to proceed to step SP5.

In step SP5, the CPU 110 determines whether the dragging continues. When the positive result is obtained in step SP5, the CPU 110 allows the process to proceed to step SP6.

In step SP6, the CPU 110 acquires a drag angle and a drag distance (movement distance between the touch positions) based on the previous touch position and the current touch position and records the drag angle and the drag distance in the RAM 112. Then, the process proceeds to step SP7.

In step SP7, the CPU 110 determines whether the previous drag angle (that is, the drag angle before a predetermined time) is recorded in the RAM 112.

When the positive result is obtained in step SP7, the positive result means that at least the current time drag angle and the previous two drag angles are recorded, and thus a distance between the drag angles used to determine the copy gesture or the cut gesture can be calculated. Then, the CPU 110 allows the process to proceed to step SP8.

In step SP8, the CPU 110 determines whether the direction of the dragging is the horizontal direction of the screen and the absolute value of the difference between the drag angles is 90 degrees or more.

When the positive result is obtained in step SP8, the positive result means that this dragging is the copy gesture. Then, the CPU 110 allows the process to proceed to step SP9, ends the determination of the gesture operation, copies the selected portion, and then returns the process to step SP1.

On the other hand, when the negative result is obtained in step SP5 described above, the negative result means that the dragging ends without determination of the copy gesture. Then, the CPU 110 allows the process to proceed to step SP10.

In step SP10, the CPU 110 determines whether the length of the dragging is equal to or less than a predetermined value on the assumption that the sum of the distances of the drag distances recorded in the RAM 112 is the length of the dragging.

When the positive result is obtained in step SP10, the positive result means that this dragging is the cut gesture. Then, the CPU 110 allows the process to proceed to step SP11, ends the determination of the gesture operation, cuts the selected portion, and returns the process to step SP1.

On the other hand, when the negative result is obtained in step SP10 described above, the negative result means that this dragging is not the gesture operation and is simple dragging. Then, the CPU 110 allows the process to step SP12, ends the determination of the gesture operation, and scrolls the document in response to the dragging, for example. Then, the process returns to step SP1.

In accordance with the processing sequence RT1, the CPU 110 determines the gesture operation and copies or cuts the selected portion in the document in response to the determined gesture operation.

1-2-5. Operations and Advantages

With such a configuration, the CPU 110 of the portable terminal 100 sets any portion as the selected portion by enclosing any portion in the document displayed on the screen in response to a predetermined touch operation.

When the dragging is executed from the inside of the selection frame Fr, the CPU 110 determines whether the dragging is the copy gesture or the cut gesture.

Here, when the motion of the dragging is a motion of pressing a fingertip and half-rotating the touching finger right and left, the CPU 110 determines that the dragging is the copy gesture, and thus copies the selected portion.

When the motion of the dragging is a motion of skimming the selected portion, smoothly moving the touching finger in any direction shortly, and detaching the finger, the CPU 110 determines that this dragging is the cut gesture and cuts the selected portion.

Thereafter, the CPU 110 pastes the copied or cut selected portion to a place designated by the user.

In the portable terminal 100, it is possible to selectively copy or cut the selected portion by the once executed gesture operation by assigning the different gesture operations to the copy and the cut of the selected portion.

Thus, the portable terminal 100 can execute the copy and the cut more easily, compared to the case where a selected portion is designated, a menu is displayed by a predetermined touch operation, and the copy or the cut is selected from the menu.

Further, when the CPU 110 copies or cuts the selected portion, the CPU 110 of the portable terminal 100 shows the pop-up Pw indicating the copied or cut selected portion on the screen for a predetermined time.

When the CPU 110 recognizes the copy gesture or the cut gesture in the pop-up Pw during the display of the pop-up Pw, the CPU 110 changes the selected portion from the cut to the copy or from the copy to the cut.

Before the selected portion is pasted, the portable terminal 100 can easily change the selected portion from the cut to the copy or the copy to the cut even after the copy or the cut of the selected portion.

With such a configuration, the portable terminal 100 can selectively copy or cut the selected portion just by changing the gesture operation without any trouble of specially displaying the menu and selecting copy or cut from the menu.

Thus, since the operation of the copy & paste and the operation of the cut & paste can be executed more easily, it is possible to improve operability compared to the related art.

2. Other Embodiments

2-1. Other Embodiment 1

In the above-described embodiment, the selection frame Fr is operated by dragging after the long pressing, the selection range is appropriately changed, the selection frame Fr is fixed when the finger is detached, and the selection range is decided. When the gesture operation is executed from the selection frame Fr, the selected portion enclosed by the selection frame Fr is copied or cut in response to the gesture operation.

When the operation of the selection frame Fr to the copy or cut can be executed by a series of dragging operations, it is expected that the operability can be further improved.

Figure 13:
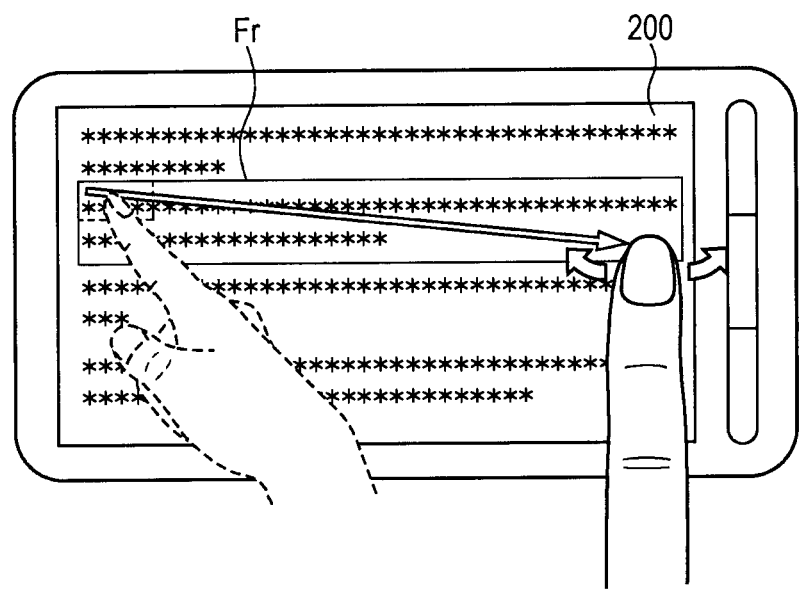
FIG. 13 is a schematic diagram illustrating a copy operation according to another embodiment.

As shown in FIG. 13, when the CPU 110 appropriately changes the size of the selection frame Fr in response to the dragging after the long pressing, and then the user executes the gesture operation before the detachment of his or her finger, the portion enclosed by the selection frame Fr may be copied or cut.

In this way, the operation of the selection frame Fr of the copy or cut of the selected portion can be executed by a series of dragging.

In this case, however, it is not preferable that the size of the selection frame Fr is changed by the gesture operation.

Therefore, it is preferable to clearly distinguish a motion for changing the size of the selection frame Fr from a motion corresponding to the gesture operation during the series of dragging.

In effect, when the operation of the selection frame Fr to the copy or the cut of the selected portion are executed by the series of dragging, it is assumed that the user executes dragging to change the size of the selection frame Fr, stops the movement of his or her finger for the moment, and then executes the gesture operation.

Thus, by determining which motion is executed after the touch position stops (that is, the movement amount becomes nearly 0), the motion for changing the size of the selection frame Fr is configured to be distinguished from the motion corresponding to the gesture operation.

That is, when the user further executes the dragging by a distance equal to or greater than a predetermined distance after the stop of the touch position, the CPU 110 determines that this motion is a motion corresponding to the operation of the selection frame Fr.

When the user executes the dragging by a distance less than the predetermined distance after the stop of the touch position and the direction of the dragging is reversed, the CPU 110 determines that this motion is a motion corresponding to the copy gesture.

When the user executes dragging by the distance less than the predetermined distance after the stop of the touch position and the direction of the dragging is not reversed, the CPU 110 determines that this motion is a motion corresponding to the cut gesture.

In this way, it is possible to clearly distinguish the motion for changing the size of the selection frame Fr from the motion corresponding to the gesture operation during the series of dragging.

2-2. Other Embodiment 2

In the above-described embodiment, the gesture operation of touching the screen with a finger by pressing the fingertip and half-rotating the finger right and left is configured as the copy gesture. Further, the gesture operation of smoothly moving a finger in any direction by skimming the selected portion and detaching the finger is configured as the cut gesture.

Embodiments of the disclosure are not limited thereto. When the copy gesture and the cut gesture are different operations from one another, various different touch operations may be configured as the copy gesture and the cut gesture.

For example, tapping (single tapping) executed once in the selection frame Fr may be configured as the copy gesture and tapping (double tapping) executed twice in the selection frame Fr may be configured as the cut gesture.

For example, short pressing executed in the selection frame Fr may be configured as the copy gesture and long pressing executed in the selection frame Fr may be configured as the cut gesture.

For example, a dragging operation of drawing a circle from the inside of the selection frame Fr may be configured as the copy gesture and a dragging operation of drawing ticking (check mark) from the inside of the selection frame Fr may be configured as the cut gesture.

2-3. Other Embodiment 3

In the above-described embodiment, when the direction of the dragging executed from the inside of the selection frame Fr is reversed from the left side to the right side or from the right side to the left side, the CPU 110 determines that this operation is the copy gesture.

Embodiments of the disclosure are not limited thereto. For example, when the direction of the dragging executed from the inside of the selection frame Fr is reversed irrespective of the reverse direction, this operation may be determined to be the copy gesture.

For example, the condition where the range of the dragging (that is, the movement range of the touch position) is within a predetermined range (for example, a range of about the width of a finger) may be added as well as the reversing of the direction of the dragging.

Further, the copy gesture may be determined in accordance with other various algorithms. The same is applied to the cut gesture.

2-4. Other Embodiment 4

In the above-described embodiment, any portion is selected in such a manner that any place in the document is long pressed, the selection frame Fr is displayed on the screen, and the user operates the selection frame Fr to change the selection range.

Embodiments of the disclosure are not limited thereto. Instead, as the method of selecting any portion in the document, other various methods may be used.

For example, when a document display app is activated and then a selection mode is selected from the menu, the CPU 110 transfers a mode to the selection mode. When dragging is executed in the selection mode, the CPU 110 displays the rectangular selection frame Fr of which a diagonal is the start point and the end point of the dragging. In accordance with this method, any portion in the document may be selected.

In the above-described embodiment, when the clip data is stored and any place is long pressed in this state, the dialog box is displayed. When pasting is selected through the dialog box, the clip data is pasted.

Embodiments of the disclosure are not limited thereto. Instead, as the method of pasting the clip data to any place in the document, other various methods may be used.

For example, when short pressing is executed instead of the long pressing, the dialog box may be displayed and the clip data may be pasted. Alternatively, when double tapping is executed instead of the long pressing, the dialog box may be displayed and the clip data may be pasted.

Further, the clip data may be pasted immediately in response to a predetermined gesture operation without displaying the dialog box. In this case, the gesture operation may be, for example, a gesture operation (that is, the copy gesture) of pressing the fingertip, touching the screen with a finger, and half-rotating the finger right and left.

In the above-described embodiment, any portion in the document is selected, and then the selected portion (clip data) is pated to any place in the document.

Embodiments of the disclosure are not limited thereto. For example, any portion in the document may be selected, a document different from the document may be displayed, and then the selected portion may be pasted to any place in the displayed document.

Moreover, any portion in the document may be selected, an app, such as a mail app, other than the document display app may be activated, and then the selected portion may be pasted to any place in a mail text displayed by the main app.

2-5. Other Embodiment 5

In the above-described embodiment, the case has hitherto been described in which the horizontally long document display screen 200 is displayed on the touch screen 102 in the vertical direction. However, embodiments of the disclosure are not limited thereto. Instead, a vertically long document display screen 200 may be displayed in the vertical touch screen 102.

In this case, for example, a user may be permitted to suitably select the direction in which the document display screen 200 is displayed.

Even when the vertically long document display screen 200 is displayed in the touch screen in the vertical direction, the copy & paste and the cut & paste can be executed by the same operation method as that of the above-described embodiment.

2-6. Other Embodiment 6

In the above-described embodiment, the case has hitherto been described in which a document or an image is copied or cut. However, embodiments of the disclosure are not limited thereto. Instead, various kinds of information may be copied or cut as long as the display is displayed on the screen.

2-7. Other Embodiment 7

In the above-described embodiment, the embodiment of the disclosure is applied to the portable terminal 100 including the electrostatic capacity touch panel 102B.

Embodiments of the disclosure are not limited thereto. Instead, the embodiment of the disclosure is applicable to an apparatus including various types of operation devices, such as a pressure-sensitive touch panel or an optical sensor type touch screen having an optical sensor in a liquid crystal panel, capable of performing an input operation by the gesture operation.

The embodiments of the disclosure are applicable to apparatuses including various types of display devices such as an organic EL (Electro-Luminescence) panel instead of the liquid crystal panel 102A or apparatuses connected to various types of display devices.

2-8. Other Embodiment 8

In the above-described embodiment, the portable terminal 100 serving as an information processing apparatus includes the touch screen 102 serving as an operation unit and a display unit and the CPU 110 serving as a control unit.

Embodiments of the disclosure are not limited thereto. Instead, the respective functional units (the operation unit, the control unit, and the display unit) of the above-described portable terminal 100 may be configured by various kinds of hardware or by a combination of hardware and software.

2-9. Other Embodiment 9

In the above-described embodiment, the programs (including the application) executing various processes are written in the non-volatile memory 111 of the portable terminal 100.

Embodiments of the disclosure are not limited thereto. For example, a slot for a storage medium such as a memory card may be formed in the portable terminal 100 and the CPU 110 may read a program from the storage medium inserted into the slot.

Moreover, the CPU 110 may install the program read from the storage medium in the non-volatile memory 111. Furthermore, the CPU 110 may download a program from an apparatus on a network via the network interface 113 and may install the program in the non-volatile memory 111.

2-10. Other Embodiment 10

Embodiments of the disclosure are not limited to the other embodiments of the above-described embodiment. That is, the disclosure includes a combination of the parts or entireties of the other embodiments of the above-described embodiment or an extracted from.

The present disclosure contains subject matter related to that disclosed in Japanese Priority Patent Application JP 2010-199348 filed in the Japan Patent Office on Sep. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus comprising:
an operation unit; and
a control unit performing a process in response to an operation executed through the operation unit,
wherein different gesture operations are able to be assigned to an operation corresponding to copy of information and an operation corresponding to cut of information, respectively,
wherein the control unit selects a portion designated by a user in information displayed on a display unit, and then copies the selected portion when the user executes the gesture operation corresponding to the copy through the operation unit, whereas the control unit cuts the selected portion when the user executes the gesture operation corresponding to the cut through the operation unit,
wherein a sub-screen that displays a copy of contents of the selected portion is displayed on the display unit upon execution by the user through the operation unit of the gesture operation corresponding to the copy or of the gesture operation corresponding to the cut, wherein, when the user has executed the gesture operation corresponding to the copy through the operation unit and prior to a subsequently executed paste command being received through the operation unit, the control unit, upon receipt of the gesture operation corresponding to the cut executed upon the displayed sub-screen, changes the selected portion from being copied to being cut, and wherein, when the user has executed the gesture operation corresponding to the cut through the operation unit and prior to a subsequently executed paste command being received through the operation unit, the control unit, upon receipt of the gesture operation corresponding to the copy executed upon the displayed sub-screen, changes the selected portion from being cut to being copied.

2. The information processing apparatus according to claim 1, wherein the operation unit is configured so that a touch operation is executed, and wherein the gesture operation corresponding to the copy and the gesture operation corresponding to the cut are predetermined touch operations different from each other.

3. The information processing apparatus according to claim 2, wherein the control unit displays a selection frame used for the user to designate a selection range, which is a portion to be selected, on the display unit together with the information in response to an operation executed through the operation unit and selects a portion enclosed by the selection frame in the information.

4. The information processing apparatus according to claim 3, wherein the control unit copies the selected portion when the inside of the selection frame displayed on the display unit is touched and the gesture operation corresponding to the copy is executed, whereas the control unit cuts the selected portion when the inside of the selection frame is touched and the gesture operation corresponding to the cut is executed.

5. The information processing apparatus according to claim 4, wherein when the gesture operation corresponding to the copy or the cut is executed, the control unit copies or cuts the selected portion and shows the sub-screen, which indicates that the selected portion is copied or cut, on the display unit for a predetermined time.

6. The information processing apparatus according to claim 5, wherein the control unit changes the selected portion from the copy to the cut when the inside of the sub-screen is touched and the gesture operation corresponding to the cut is executed during the display of the sub-screen after the copy of the selected portion, whereas the control unit changes the selected portion from the cut to the copy when the inside of the sub-screen is touched and the gesture operation corresponding to the copy is executed during the display of the sub-screen after the cut of the selected portion.

7. The information processing apparatus according to claim 6, wherein when the control unit changes the selection range by changing the size of the selection frame in response to dragging executed through the operation unit and the gesture operation corresponding to the copy or the cut continues without detachment of a finger of the user executing the dragging, the control unit selects a portion enclosed by the selection frame and copies or cuts the selected portion.

8. The information processing apparatus according to claim 7, wherein when an image included in the information is touched and the gesture operation corresponding to the copy or the cut is executed, the control unit performs processes from selection of the image to the copy or the cut of the image at once.

9. The information processing apparatus according to claim 8, wherein the gesture operation of the copy is a touch operation of touching the inside of the selection frame with the finger, pressing the fingertip, and half-rotating the finger right and left.

10. The information processing apparatus according to claim 8, wherein the gesture operation of the cut is a touch operation of touching the inside of the selection frame with the finger, skimming the portion enclosed by the selection frame, and smoothly moving the finger in any direction.

11. The information processing apparatus according to claim 1, wherein the sub-screen is displayed on the display unit to cover at least a part of the display unit at which the selected portion is displayed prior to the copy or cut performed on the selected portion.

12. An operation method comprising: by a control unit, selecting a portion designated by a user in information displayed on a display unit;

copying the selected portion when the user executes the gesture operation corresponding to copy through an operation unit, whereas cutting the selected portion when the user executes a gesture operation, which is different from the gesture operation corresponding to the copy, corresponding to cut;

displaying, upon execution by the user through the operation unit of the gesture operation corresponding to the copy or of the gesture operation corresponding to the cut, a sub-screen on the display unit, the sub-screen displaying a copy of contents of the selected portion, wherein, when the user has executed the gesture operation corresponding to the copy through the operation unit and prior to a subsequently executed paste command being received through the operation unit, the selected portion is changed from being copied to being cut upon receipt of the gesture operation corresponding to the cut executed upon the displayed sub-screen, and wherein, when the user has executed the gesture operation corresponding to the cut through the operation unit and prior to a subsequently executed paste command being received through the operation unit, the selected portion is changed from being cut to being copied upon receipt of the gesture operation corresponding to the copy executed upon the displayed sub-screen.

13. A non-transitory computer-readable medium having embodied thereon a program, which when executed by a computer causes the computer to execute a method, the method comprising:

selecting a portion designated by a user in information displayed on a display unit; and copying the selected portion when the user executes the gesture operation corresponding to copy through an operation unit, whereas cutting the selected portion when the user executes a gesture operation, which is different from the gesture operation corresponding to the copy, corresponding to cut;

displaying, upon execution by the user through the operation unit of the gesture operation corresponding to the copy or of the gesture operation corresponding to the cut, a sub-screen on the display unit, the sub-screen displaying a copy of contents of the selected portion, wherein, when the user has executed the gesture operation corresponding to the copy through the operation unit and prior to a subsequently executed paste command being received through the operation unit, the selected portion is changed from being copied to being cut upon receipt of the gesture operation corresponding to the cut executed upon the displayed sub-screen, and wherein, when the user has executed the gesture operation corresponding to the cut through the operation unit and prior to a subsequently executed paste command being received through the operation unit, the selected portion is changed from being cut to being copied upon receipt of the gesture operation corresponding to the copy executed upon the displayed sub-screen.

14. An information processing apparatus comprising:
an operation unit; and
a control unit performing a process in response to an operation executed through the operation unit,
wherein different gesture operations are able to be assigned to an operation corresponding to copy of information and an operation corresponding to cut of information, respectively,
wherein the control unit selects a portion designated by a user in information displayed on a display unit, and then copies the selected portion when the user executes the gesture operation corresponding to the copy through the operation unit, whereas the control unit cuts the selected portion when the user executes the gesture operation corresponding to the cut through the operation unit,
wherein a sub-screen that displays a copy of contents of the selected portion is displayed on the display unit upon execution by the user through the operation unit of the gesture operation corresponding to the copy or of the gesture operation corresponding to the cut, and
wherein when a displayed portion included in the information is touched and the gesture operation corresponding to the copy or the cut is executed all in a single gesture through the operation unit, the control unit performs processes from selection of the displayed portion to the copy or the cut of the information at once in accordance with the single gesture.

15. The information processing apparatus according to claim 14, wherein the single gesture is executed by an execution through the operation unit where contact with the operation unit is maintained throughout the entire single gesture.

16. The information processing apparatus according to claim 14, wherein the single gesture comprises the touching of the displayed portion and the gesture operation corresponding to the copy or the cut.

17. The information processing apparatus according to claim 14, wherein the displayed portion is a displayed image.

18. The information processing apparatus according to claim 14, wherein the operation unit is a touch screen.

19. The information processing apparatus according to claim 18, wherein the gesture operation is performed by an operating member upon the touch screen.

20. The information processing apparatus according to claim 19, wherein the operating member is a human finger.

* * * * *